United States Patent [19]

Wilcox

[11] Patent Number: 4,688,761

[45] Date of Patent: Aug. 25, 1987

[54] VEHICLE INTERIOR DOOR PANEL REMOVAL TOOL

[75] Inventor: Melvin S. Wilcox, Davison, Mich.

[73] Assignee: Aircraft Specialties, Inc., Lapeer, Mich.

[21] Appl. No.: 888,344

[22] Filed: Jul. 23, 1986

[51] Int. Cl.[4] .................. B23P 19/04

[52] U.S. Cl. .................. 254/104; 29/239

[58] Field of Search .................. 29/239; 254/104, 28, 254/25, 11, 17; 16/110 R; 81/489; 294/62, 92

[56] References Cited

U.S. PATENT DOCUMENTS

| | | | |
|---|---|---|---|
| 1,559,976 | 11/1925 | Ness | 254/131 |
| 3,006,679 | 10/1961 | Gray | 294/92 |
| 3,185,442 | 5/1965 | Hemphill | 254/104 |
| 3,191,909 | 6/1965 | Reischl | 254/104 |
| 3,997,957 | 12/1976 | Tone et al. | 29/239 |
| 4,009,743 | 3/1977 | Ackerman | 30/169 |
| 4,205,823 | 6/1980 | Goldy | 254/28 |
| 4,291,998 | 9/1981 | Santos | 16/110 R |

*Primary Examiner*—Robert C. Watson
*Attorney, Agent, or Firm*—Beaman & Beaman

[57] ABSTRACT

A tool for removing vehicle interior door trim panels held in position by push-in fasteners by a sliding movement, the tool consisting of a molded plastic body having spaced wedge surfaces receiving the fastener therebetween, and a handle affixed to the body extends thereover in spaced relationship producing a concise configuration permitting use of the tool in restricted clearance locations. The synthetic plastic body may be reinforced by metal inserts, and will not damage the door panel fabric or the door frame metal adjacent the interior trim panel.

4 Claims, 11 Drawing Figures

VEHICLE INTERIOR DOOR PANEL REMOVAL TOOL

BACKGROUND OF THE INVENTION

Interior door trim panels for vehicles are often mounted to the interior of the metal door frame by push-in fasteners. In order to provide access to the door structure, such as window regulators, locks, etc., the interior door trim panels must be removed. Usually, removal of the trim panel is done with a thin metal prying tool inserted under the interior panel to pry the panel away from the metal door frame and pull the fasteners from their openings.

Such prying tools normally used by automobile mechanics are not specially adapted for interior door trim panel removal, and often damage the door panel fabric or scratch the metal door frame upon which the panel is mounted. Also, the fasteners may be damaged by the pry tools.

Another problem with conventional thin, flat, metal tools used to remove interior door trim panels is that such tools are relatively long and cannot be used in restricted locations, such as may occur at the forward edge of a door.

It is an object of the invention to provide an interior door trim panel removal tool which permits interior door panels to be removed without prying, and without damage to the trim panel or door frame.

A further object of the invention is to provide an interior door trim panel removal tool having a wedge-shaped body formed of synthetic plastic material which prevents damage to the door frame and interior trim panel, but which is of sufficient strength to be very durable.

Another object of the invention is to provide an interior door trim panel removal tool which is self-lubricating in order to permit ease of use, readily accommodates a variety of types of panel fasteners, and which may be easily used by relatively unskilled operators.

Yet another object of the invention is to provide an interior door trim panel removal tool which is of a concise configuration and may be used in spaced restricted locations inaccessible to conventional panel removal tools.

In the practice of the invention a molded synthetic glass-filled plastic body having wedge surfaces utilizes a handle which is located "over the top" of the body wherein the total length of the tool is only slightly greater than the length of the wedge body.

The body is provided with a longitudinal central slot for receiving the door trim panel fasteners, and includes wedge surfaces of angular relationship wherein the body may longitudinally slide under the trim panel with the fastener received within the slot, and the panel will be pulled away from the metal door frame without prying. As only the self-lubricating synthetic plastic material of the wedge body engages the metal door frame scratching of the frame is prevented.

A tubular metal handle includes a lower end which extends into an opening in the rear of the wedge body and a screw in the body passes through the lower end of the handle to firmly lock the handle to the body.

The central portion of the handle is bent through a substantially 180° radius wherein the outer free end of the handle forms a hand grip disposed over the wedge body in spaced relationship thereto, and the location of the handle hand grip over the tool body reduces the length of the tool and permits use in spaced restricted areas.

In an embodiment of the invention metal inserts are located within the molded wedge body and the handle affixing screw extends therethrough whereby greater strength is achieved without sacrifice of the nonscratching or door trim panel nonharming characteristics of the tool.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
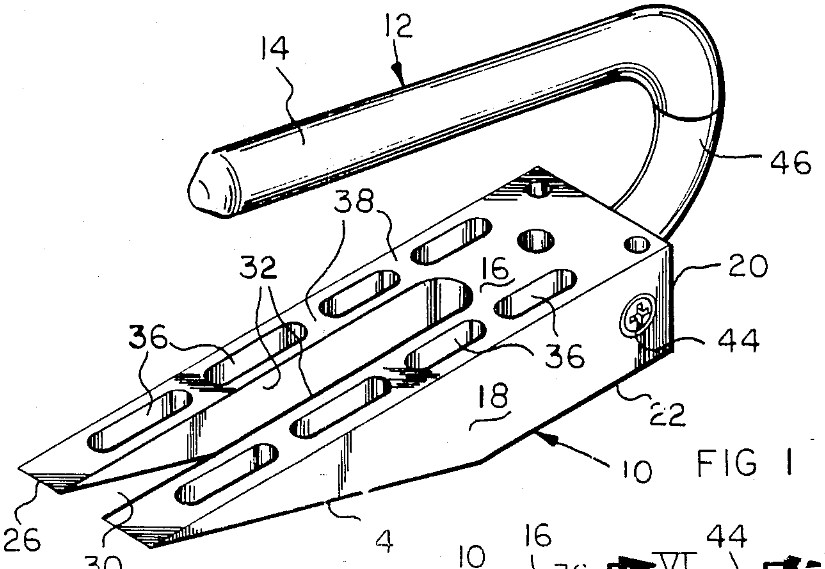
FIG. 1 a perspective view of an interior door trim panel removal tool in accord with the invention, FIG. 2 side, elevational view of the wedge body.
Figure 2:
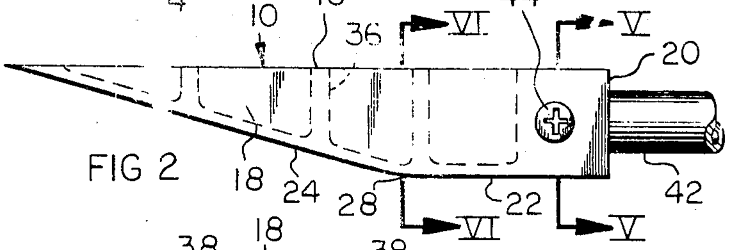

An interior door trim panel removal tool in accord with the invention includes a body 10 having a handle 12 attached thereto. The body 10 is molded of a synthetic plastic material such as a glass-filled nylon having high strength and self-lubricating characteristics. The handle 12 is formed of a metal tube, and at its free end is covered with a plastisol hand grip 14.

The configuration of the body 10 will be appreciated from the drawings. Basically, the body includes a flat upper surface 16, lateral surfaces 18, a flat rear surface 20, a flat bottom surface 22 parallel to the upper surface 16, and an oblique bottom surface 24 which intersects the upper surface at a forward edge apex 26 and the bottom surface 22 at 28.

Figure 3:
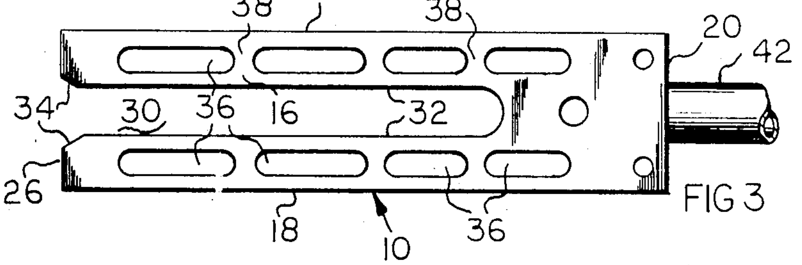
FIG. 3 is a top, plan, elevational view of the wedge body.

Centrally, a slot 30 is defined in the body 10 intersecting the forward edge 26 of the tool, and the slot extends approximately $\frac{3}{4}$ the length of the body. As will be appreciated, the slot 30 intersects the upper surface 16 and the bottom surfaces 22 and 24 bifurcating the major portion of the body length. The slot 30 is defined by the spaced parallel surfaces 32, FIG. 3, and the spacing between the surfaces 32 is such as to readily receive the variety of push-in fasteners utilized to attach vehicle interior door trim panels to the door metal frame. Champhered surfaces 34, FIG. 3, are formed in the slot adjacent the forward edge 26 to facilitate entrance of the fastener into the slot.

In the embodiment of FIGS. 1–6, a plurality of blind cavities 36 are located upon each side of the slot 30 in the body 10 intersecting the upper surface 16 but terminating short of bottom surfaces 22 and 24. The cavities 36 are separated by webs 38, and reduce the amount of material required to form the body without sacrifice of strength.

Figure 5:
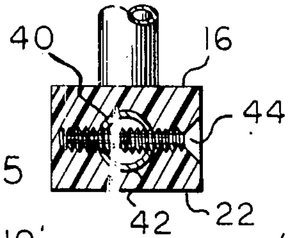
FIG. 5 is an elevational, sectional view as taken along Section V—V of FIG. 2.
Figure 6:
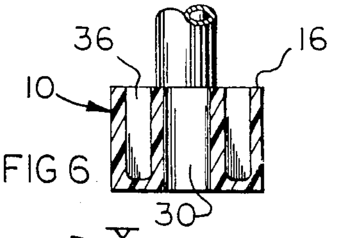
FIG. 6 is an elevational, sectional view as taken along Section VI—VI of FIG. 2.

A cylindrical bore 40 is defined in the body 10, FIG. 5, intersecting the rear surface 20, and the lower end 42 of the handle 12 is received therein. A screw 44 threaded within a hole in the body 10 is of the self-threading type and passes through holes in the handle lower end 42 to firmly affix the handle 12 to the body and prevent relative rotation thereto. The handle central region 46 is bent in a substantially 180° radius which locates the handle free end encased within hand grip 14 in a superimposed relationship over the body 10 and spaced from upper surface 16 in a substantially parallel relationship thereto.

Figure 7:
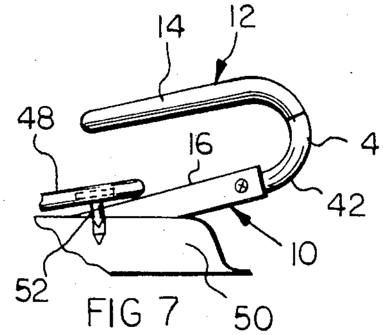
FIG. 7 is a partial outline view illustrating use of the tool.
Figure 4:
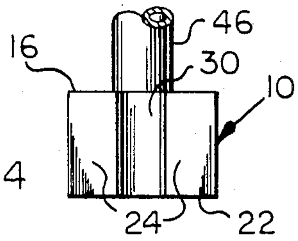
FIG. 4 is a front, elevational view of the wedge body as taken from the left of FIG. 3.

In use, the forward edge 26 of the tool is inserted between the interior door trim panel 48 and the metal door frame 50, FIG. 7. This wedging action will force the trim panel 48 away from the frame 50 and permit location of the nearest trim panel push-in fastener 52. Upon locating the fastener 52, the body 10 is pushed across the door frame 50 in a sliding movement aligning the fastener 52 with the slot 30, and as the body slides across the door frame the fastener will enter the slot 30 and the wedge shape of the body pull the fastener from its hole in the door frame 50, as shown in FIG. 7. This procedure is repeated until all of the fasteners of the trim panel 48 have been removed.

The angle of the bottom wedge surface 24 with respect to the upper surface 16 is such that the sliding insertion of the tool body about a fastener 52 without a prying action is sufficient to pull the fastener from its hole. As prying may damage the trim panel 48 or the door frame 50, the tool of the invention prevents such damage, and as the nylon material of the wedge body 10 is self-lubricating and surface 24 is smooth the body will slide easily between the trim panel and door frame.

As the free end of the handle 12 is disposed over the body 10 a concise length configuration of the tool is produced as will be appreciated from FIGS. 1 and 7, and the tool may be readily used at the leading edges of doors wherein only restricted clearance is available.

Figure 8:
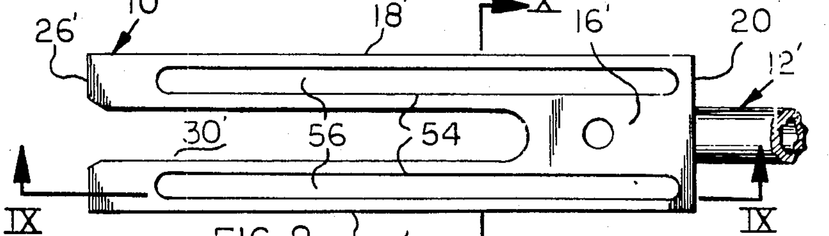
FIG. 8 is a top, plan view of another embodiment of a wedge body in accord with the invention.
Figure 9:
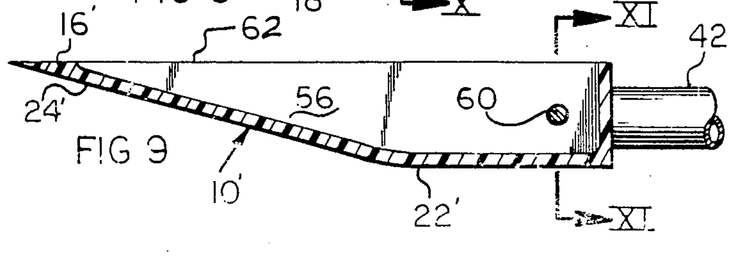
FIG. 9 is an elevational, sectional view as taken along Section IX—IX of FIG. 8.

A variation in the tool body construction is shown in the embodiment illustrated in FIGS. 8–11 wherein components similar to those previously described are identified by primed reference numerals. In this embodiment the overall configuration of the wedge body 10 and handle 12 is identical to that described above except that the webs 38 have been re-moved producing a single elongated cavity 54 on each side of slot 30'. Metal inserts 56 of a configuration which will be appreciated from FIGS. 8 and 9 are located within the cavities 54.

Figure 11:
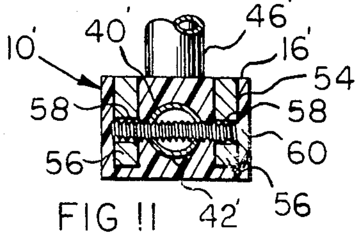
FIG. 11 is an elevational, sectional view as taken along Section XI—XI of FIG. 9.

The metal inserts 56 are provided with holes 58, FIG. 11, for receiving the handle attachment screw 60, and the screw 60 passes through both the inserts 56 and handle end 42', assuring attachment of the handle 12' to the body and further fixing the inserts within the body.

Figure 10:
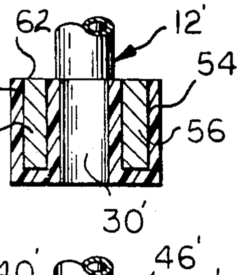
FIG. 10 is an elevational, sectional view taken along Section X—X of FIG. 8.

In the embodiment of FIGS. 8–10 the metal inserts 56 do not intersect the bottom wedge surface 24' or surface 22', or any other surfaces which engage the door frame 50, and as the upper edge 62 of the inserts coincide with the body upper surface 16' the inserts will not harm the trim panel 48 or the fasteners 52.

It will be appreciated that the interior door trim panel removal tool of the invention provides an inexpensive tool for removing door trim panels without damage to the panels or the door frame. The tool may be used in concise clearance locations, and as uniform forces are imposed on either side of the trim panel fastener, the likelihood of damage to the fasteners, or the interior trim adjacent the fastener, is minimized. As the tool permits trim panel removal without prying, the likelihood of damage to the trim panel and door frame is minimized, and the self-lubricating character and smooth surfaces of the body 10 contribute to its ease of use and protection of the panel and door surfaces.

It is appreciated that various modifications to the inventive concepts may be apparent to those skilled in the art without departing from the spirit and scope of the invention.

I claim:

1. A tool for removing trim panels from a frame wherein the trim panel is attached to the frame by push-in fasteners, comprising, in combination, an elongated molded body of rigid synthetic plastic self-lubricating material having an upper surface, front and rear lower surfaces, lateral sides, a front end and a rear surface transversely disposed to and intersecting said rear lower surface and said lateral sides, said upper surface and said front lower surface being obliquely related to each other defining an acute angle therebetween forming a wedge having an apex at said body front end, an elongated slot defined in said body of a length substantially ¾ of the length of said body and intersecting said upper and lower surfaces and said front end bifurcating said body adjacent said front end to form spaced legs each defined by said upper and front lower surfaces, and an elongated handle affixed to said body extending from said rear surface thereof having a curved configuration and a hand receiving portion defined thereon located over said body upper surface in spaced relationship thereto.

2. In a tool for removing trim panels as in claim 1, said body being formed of glass-filled nylon.

3. In a tool for removing trim panels as in claim 1, a bore defined in said body intersecting said rear surface, said handle comprising an inner end received within said bore, a central portion comprising an arcuate bend of approximately 180°, and a free end, said hand-receiving portion being defined on said free end and said free end being in superimposed spaced relation to said body upper surface, and fastening means defined in said body fixing said handle inner end within said body bore.

4. In a tool for removing trim panels as in claim 1, a metal insert in each body leg within the configuration thereof, said inserts each having a lower edge extending toward and spaced from said front and rear lower surfaces and an upper edge coincident with said body upper surface.

* * * * *